United States Patent
Mitani et al.

(10) Patent No.: US 9,309,796 B2
(45) Date of Patent: Apr. 12, 2016

(54) PARTICULATE MATTER PROCESSING APPARATUS

(75) Inventors: Shinichi Mitani, Susono (JP); Hiroshi Nomura, Gotenba (JP); Eiji Murase, Gotenba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/005,125

(22) PCT Filed: Mar. 16, 2011

(86) PCT No.: PCT/JP2011/056299
§ 371 (c)(1),
(2), (4) Date: Sep. 13, 2013

(87) PCT Pub. No.: WO2012/124090
PCT Pub. Date: Sep. 20, 2012

(65) Prior Publication Data
US 2014/0000244 A1    Jan. 2, 2014

(51) Int. Cl.
*F01N 3/00* (2006.01)
*F01N 3/021* (2006.01)
(Continued)

(52) U.S. Cl.
CPC . *F01N 3/021* (2013.01); *B03C 3/41* (2013.01); *B03C 3/49* (2013.01); *B03C 3/68* (2013.01); *F01N 3/01* (2013.01); *F01N 9/00* (2013.01); *F01N 11/00* (2013.01); *B03C 2201/08* (2013.01); *B03C 2201/24* (2013.01);
(Continued)

(58) Field of Classification Search
CPC ....... F01N 3/0892; F01N 3/01; F01N 3/0275; F01N 2240/08; F01N 2240/34; F01N 13/02; F02B 3/06; B01D 53/32; B01D 53/323; B01D 2259/80

USPC ............ 60/275, 285, 295.277, 311, 273, 274, 60/278, 279, 605.2
See application file for complete search history.

(56) References Cited

U.S. PATENT DOCUMENTS 4,629,535 A * 12/1986 Oyama ............... F02D 41/1476
204/425
8,863,496 B2 * 10/2014 Mitani et al. .................... 60/227
(Continued)

FOREIGN PATENT DOCUMENTS

EP    1239126 A2    9/2002
EP    2578822 A1    4/2013
(Continued)

OTHER PUBLICATIONS

Non-Final Office Action issued in U.S. Appl. No. 14/005,073 dated Feb. 25, 2015.
(Continued)

*Primary Examiner* — Patrick Maines
(74) *Attorney, Agent, or Firm* — Sughrue Mion, PLLC

(57) ABSTRACT

An excessively large electric current is suppressed from flowing to an electrode. Provision is made for an electrode arranged in an exhaust passage of an internal combustion engine, a power supply connected to the electrode for applying a voltage thereto, an air fuel ratio detection device for detecting or estimating an air fuel ratio of an exhaust gas which flows through the exhaust passage, and a power upper limit setting device for setting an upper limit for electric power supplied to the electrode from the power supply in cases where the air fuel ratio detected or estimate.

3 Claims, 2 Drawing Sheets

(51) Int. Cl.
*B03C 3/41* (2006.01)
*B03C 3/49* (2006.01)
*B03C 3/68* (2006.01)
*F01N 9/00* (2006.01)
*F01N 11/00* (2006.01)
*F01N 3/01* (2006.01)

(52) U.S. Cl.
CPC ......... *B03C2201/30* (2013.01); *B03C 2201/32* (2013.01); *F01N 2550/22* (2013.01); *F01N 2560/025* (2013.01); *F01N 2560/07* (2013.01); *F01N 2900/0601* (2013.01); *F01N 2900/1411* (2013.01); *F01N 2900/16* (2013.01); *Y02T 10/20* (2013.01); *Y02T 10/47* (2013.01)

(56) References Cited

U.S. PATENT DOCUMENTS

| | | | | |
|---|---|---|---|---|
| 2006/0168951 | A1* | 8/2006 | Opris | F01N 3/027 60/297 |
| 2009/0008165 | A1* | 1/2009 | Muta | 180/65.2 |
| 2012/0255284 | A1* | 10/2012 | Mitani | F01N 11/00 60/275 |
| 2012/0272641 | A1* | 11/2012 | Mitani | F01N 3/0275 60/275 |
| 2013/0073180 | A1* | 3/2013 | Murase | F01N 3/01 701/102 |
| 2013/0340415 | A1* | 12/2013 | Mitani | B03C 3/41 60/311 |
| 2013/0340416 | A1* | 12/2013 | Mitani | B03C 3/383 60/311 |
| 2014/0000243 | A1* | 1/2014 | Mitani | B03C 3/41 60/275 |
| 2014/0000248 | A1* | 1/2014 | Mitani | B03C 3/41 60/311 |
| 2014/0007650 | A1* | 1/2014 | Mitani | B03C 3/41 73/23.31 |

FOREIGN PATENT DOCUMENTS

| | | | |
|---|---|---|---|
| JP | 04121411 A | * | 4/1992 |
| JP | 2006-194116 A | | 7/2006 |
| JP | 2006194116 A | * | 7/2006 |
| JP | 2007-64132 A | | 3/2007 |
| JP | 2009-243419 A | | 10/2009 |
| WO | 2008138023 A1 | | 11/2008 |
| WO | 2011/148461 A1 | | 12/2011 |

OTHER PUBLICATIONS

Final Office Action issued in U.S. Appl. No. 14/005,073 dated Sep. 24, 2015.

* cited by examiner

PARTICULATE MATTER PROCESSING APPARATUS

CROSS REFERENCE TO RELATED APPLICATIONS

This application is a National Stage of International Application No. PCT/JP2011/056299, filed on Mar. 16, 2011, the contents of all of which are incorporated herein by reference in their entirety.

TECHNICAL FIELD

The present invention relates to a particulate matter processing apparatus.

BACKGROUND ART

There has been known a technique in which a discharge electrode is arranged in an exhaust passage of an internal combustion engine, and a corona discharge is caused to occur from the discharge electrode, whereby particulate matter (hereinafter also referred to as PM) is charged and condensed or aggregated (see, for example, a first patent document). By the condensation or aggregation of the particulate matter, the number of particles in the particulate matter can be decreased. In addition, the sizes of particles in the particulate matter become large, so when a filter is arranged at a downstream side, it becomes easy to trap the particulate matter with the filter.

However, electricity flows to the electrode through unburnt fuel such as HC, CO, etc., contained in an exhaust gas, too. In the past, no consideration has been given to an electric current passing to the electrode through this unburnt fuel. Then, when a lot of unburnt fuel is contained in the exhaust gas, an electric current passing through the electrode may become large, thus giving rise to a fear that a power supply, the electrode, or other circuits may be deteriorated or failed. In addition, if the apparatus is constructed so as to withstand a large electric current, it will result in an increase in the cost of production. Moreover, when the electric current increases, electric power consumption will become large, so there will also be a fear that fuel economy may get worse.

PRIOR ART REFERENCES

Patent Documents

[First Patent Document] Japanese patent application laid-open No. 2006-194116

SUMMARY OF THE INVENTION

Problems to be Solved by the Invention

The present invention has been made in view of the problems as referred to above, and has for its object to suppress an excessively large electric current from passing to an electrode.

Means for Solving the Problems

In order to achieve the above-mentioned object, a particulate matter processing apparatus according to the present invention is provided with an electrode that is arranged in an exhaust passage of an internal combustion engine;

a power supply that is connected to said electrode and applies a voltage thereto;

an air fuel ratio detection device that detects or estimates an air fuel ratio of an exhaust gas which flows through said exhaust passage; and a power upper limit setting device that sets an upper limit for electric power supplied to said electrode from said power supply in cases where the air fuel ratio detected or estimated by said air fuel ratio detection device is a rich air fuel ratio.

Here, when the voltage is applied to the electrode, the particulate matter can be electrified or charged. The charged particulate matter is caused to move toward an inner wall of the exhaust passage by means of a Coulomb force or a flow of the exhaust gas. The particulate matter, which has reached the inner wall of the exhaust passage, releases electrons to the exhaust passage, so electricity flows to a ground side rather than to the electrode. Then, the particulate matter, which has released the electron, aggregates with other particulate matter which exists nearby, so it is possible to decrease the number of particles.

In addition, when HC, CO, or the like, which is unburnt fuel, is contained in the exhaust gas, the unburnt fuel serves as a carrier, so when the voltage is applied to the electrode, an electric current passes to it through the unburnt fuel. Then, in cases where the air fuel ratio of the exhaust gas is a rich air fuel ratio, a lot of unburnt fuel is contained in the exhaust gas, so the electric current passing through the electrode becomes very large.

The electric current passing through the unburnt fuel such as HC, CO, etc., at the time when the air fuel ratio of the exhaust gas is a rich air fuel ratio becomes larger than the electric current passing through the particulate matter. Then, an excessively large electric current passes to various kinds of devices, so there is a fear that these devices may be deteriorated. On the other hand, in the case of a rich air fuel ratio, the power upper limit setting device sets the upper limit for the amount of electric power to be supplied. That is, even when the electric current becomes large due to a large amount of unburnt fuel contained in the exhaust gas, if the upper limit for electric power is set, the voltage will become smaller as the electric current becomes further larger after the electric power has reached the upper limit. Because it becomes difficult for electrons to be released from the electrode due to the voltage becoming smaller, the electric current can be suppressed, so that it is possible to suppress an excessively large electric current from passing to the electrode, the power supply, etc. In addition, because the voltage can be made to be applied to the electrode, while setting the upper limit for electric power, it is possible to facilitate the aggregation of the particulate matter.

Moreover, in the present invention, said power upper limit setting device can set said upper limit in such a manner that the lower the air fuel ratio detected or estimated by said air fuel ratio detection device, the smaller becomes said upper limit.

That is, the lower the air fuel ratio, the higher becomes the concentration of the unburnt fuel in the exhaust gas, so a larger electric current can pass therethrough. In contrast to this, by making the upper limit of the electric power smaller, the electric power can reach the upper limit in an earlier period of time, and hence, it is possible to suppress an excessively large electric current from passing to the electrode and the power supply.

Further, in the present invention, provision is further made for an exhaust gas amount detection device that detects or estimates an amount of exhaust gas in the internal combustion engine, wherein said power upper limit setting device can set the upper limit in a such manner that the more the amount of exhaust gas detected or estimated by said exhaust gas amount detection device, the smaller becomes said upper limit.

The amount of exhaust gas may be a mass of the exhaust gas flowing through the exhaust passage per unit time. The more the amount of exhaust gas, the more unburnt fuel passes through the surroundings of the electrode, so a larger electric current can pass therethrough. In contrast to this, by making the upper limit of the electric power smaller, the electric power can reach the upper limit in an earlier period of time, thus making it possible to suppress an excessively large electric current from passing to the electrode and the power supply.

In the present invention, provision can be made for:

a processing part that is arranged in said exhaust passage with said electrode installed therein;

an insulation part that insulates electricity between said processing part and said exhaust passage;

a ground part that grounds said processing part; and a current detection device that detects an electric current in said ground part.

The current detection device detects the electric current at an electric potential reference point side from the electrode. In general, wiring is made often longer or thicker at a power supply side from the electrode than at a ground side from the electrode. In addition, electric charge may be stored at the power supply side from the electrode. In that case, for example, in cases where an electric current is detected in the power supply side from the electrode, even if a strong discharge is generated in the electrode, the rising and falling of the electric current detected by the current detection device at that time become slow. On the other hand, in the ground side from the electrode, wiring can be made relatively short and thin. For this reason, it is possible to detect the electric current in a more accurate manner. In addition, due to the provision of the insulation part, it is possible to suppress electricity from flowing to other than the ground part. For this reason, it is possible to detect the electric current in a more accurate manner.

Effect of the Invention

According to the present invention, it is possible to suppress an excessively large electric current from flowing to the electrode.

MODE FOR CARRYING OUT THE INVENTION

Hereinafter, reference will be made to a specific embodiment of a particulate matter processing apparatus according to the present invention based on the attached drawings.

First Embodiment

Figure 1:
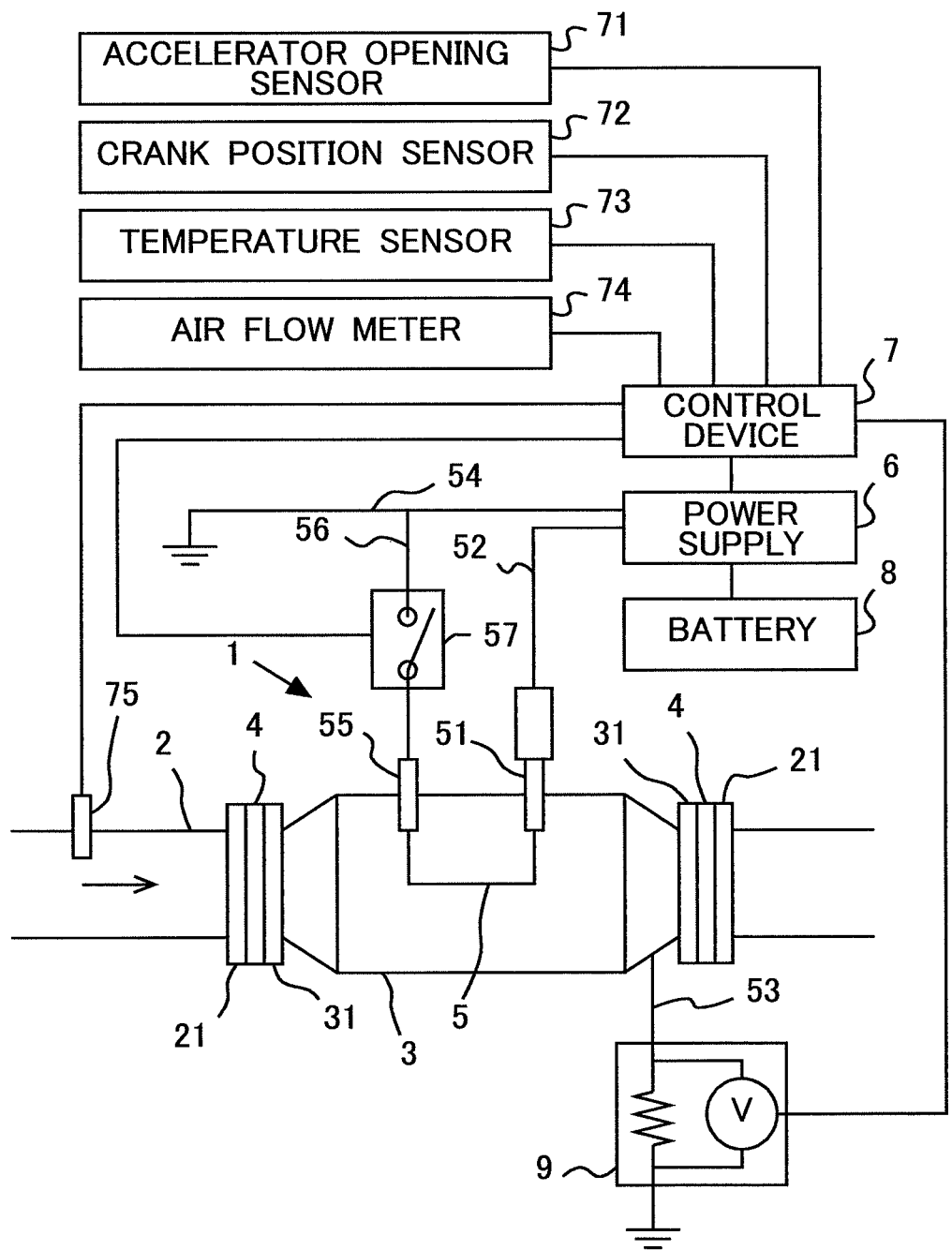
FIG. 1 is a view showing the schematic construction of a particulate matter processing apparatus according to an embodiment of the present invention.

FIG. 1 is a view showing the schematic construction of a particulate matter processing apparatus 1 according to this first embodiment of the present invention. The particulate matter processing apparatus 1 is arranged in an exhaust passage 2 of a gasoline engine.

The particulate matter processing apparatus 1 is constructed to be provided with a housing 3 which is connected at its opposite ends with the exhaust passage 2. As a material for the housing 3, there is used a stainless steel material. The housing 3 is formed into a hollow cylindrical shape with its diameter being larger than that of the exhaust passage 2. The opposite end portions of the housing 3 are each formed into a tapered shape of which the cross-sectional area becomes smaller as they become closer to their end. Here, note that in FIG. 1, an exhaust gas flows through the exhaust passage 2 in the direction of an arrow, and flows into the interior of the housing 3. For this reason, the housing 3 may also be a part of the exhaust passage 2.

The exhaust passage 2 and the housing 3 are connected to each other through insulation parts 4. The insulation parts 4 are each made of an electrically insulating material. The insulation parts 4 are each sandwiched between a flange 21, which is formed at an end of the exhaust passage 2, and a flange 31, which is formed at one adjacent end of the housing 3. The exhaust passage 2 and the housing 3 are fastened to each other, for example, by means of bolts and nuts. Then, these bolts and nuts are also subjected to insulation processing so as to prevent electricity from flowing through these bolts and nuts. In this manner, electricity is prevented from flowing between the exhaust passage 2 and the housing 3.

An electrode 5 is mounted on the housing 3. The electrode 5 penetrates through a side surface of the housing 3, extends from the side surface of the housing 3 in the direction of a central axis thereof, then bends to an upstream side of the flow of the exhaust gas in the vicinity of the central axis, and extends toward the upstream side of the flow of the exhaust gas in parallel to the central axis. Then, the electrode 5 further bends to a side surface side of the housing 3 at its upstream side, and leads to the outside while penetrating through the side surface of the housing 3.

In addition, the electrode 5 is provided with insulator parts 51, 55 each made of an electrically insulating material, which serve to prevent electricity from flowing between the electrode 5 and the housing 3. These insulator parts 51, 55 are located between the electrode 5 and the housing 3, and have a function of insulating electricity and at the same time fixedly securing the electrode 5 to the housing 3.

Then, the electrode 5 has its one end connected to a power supply 6 through a power supply side electric wire 52. The power supply 6 can supply electricity to the electrode 5 and at the same time can change a voltage to be applied thereto. This power supply 6 is connected to a control device 7 and a battery 8 through electric wires, respectively. The control device 7 controls the voltage which is applied to the electrode 5 by the power supply 6. In addition, a ground electric wire 54 for connecting the power supply 6 to a reference point of electric potential is connected to the power supply 6. The power supply 6 is connected to ground through this ground electric wire 54.

In addition, the electrode 5 has its other end connected to the ground electric wire 54 through a short circuit electric wire 56. To the middle of the short circuit electric wire 56, a switch 57 for opening and closing an electric circuit is provided or connected. An electric current flows through the short circuit electric wire 56 by turning on the switch 57 during the application of the voltage by the power supply 6. At this time, the electrode 5 is placed in a short-circuited state, so the temperature of the electrode 5 goes up. Here, note that in this embodiment, the power supply side electric wire 52 is connected to the downstream side insulator part 51 and the short circuit electric wire 56 is connected to the upstream side insulator part 55, but instead of this, the short circuit electric wire 56 may be connected to the downstream side insulator part 51, and the power supply side electric wire 52 may be connected to the upstream side insulator part 55.

Also, a ground side electric wire 53 is connected to the housing 3, so that the housing 3 is connected to ground through the ground side electric wire 53. A detection device 9, which serves to detect an electric current passing through the ground side electric wire 53, is provided or connected to the ground side electric wire 53. The detection device 9 detects the electric current, for example, by measuring a potential difference between opposite ends of a resistor which is provided or inserted in the middle of the ground side electric wire 53. This detection device 9 is connected to the control device 7 through an electric wire. Then, the electric current detected by the detection device 9 is inputted to the control device 7. Here, note that the ground side electric wire 53 is smaller in electric capacity than the power supply side electric wire 52, so a response at the time of detecting an electric current is higher when the detection device 9 is provided or connected to the ground side electric wire 53 than when the detection device 9 is provided or connected to the power supply side electric wire 52. In addition, in this embodiment, the detection device 9 corresponds to a current detection device in the present invention.

In addition, an accelerator opening sensor 71, a crank position sensor 72, a temperature sensor 73, an air flow meter 74, and an air fuel ratio sensor 75 are connected to the control device 7. The accelerator opening sensor 71 detects an engine load by outputting an electric signal corresponding to an amount of depression of an accelerator pedal at which the driver of a vehicle with the internal combustion engine installed thereon has depressed or stepped down the accelerator pedal. The crank position sensor 72 detects the number of engine revolutions per unit time. The temperature sensor 73 detects the temperature of the internal combustion engine by detecting the temperature of cooling water or the temperature of lubricating oil in the internal combustion engine. The air flow meter 74 detects an amount of intake air sucked into the internal combustion engine. The air fuel ratio sensor 75 is mounted on the exhaust passage 2 at a location upstream of the housing 3, and detects an air fuel ratio of the exhaust gas which flows through the exhaust passage 2. Here, note that in this embodiment, the air fuel ratio sensor 75 corresponds to an air fuel ratio detection device in the present invention. In addition, the air fuel ratio of the exhaust gas may be estimated from an operating state of the internal combustion engine.

Moreover, the switch 57 is connected to the control device 7 through an electric wire, so that the control device 7 can perform an ON-OFF operation of the switch 57. Here, by turning the switch into an ON state during the time when a voltage is applied to the electrode 5 from the power supply 6, an electric current passes through the short circuit electric wire 56. On the other hand, by turning the switch into an OFF state, the electric current passing through the short circuit electric wire 56 is put into a stopped state.

In the particulate matter processing apparatus 1 as constructed in this manner, electrons are released from the electrode 5 by applying a negative high direct current voltage from the power supply 6 to the electrode 5 when the switch 57 is in the OFF state. That is, electrons are caused to be released from the electrode 5 by making the electric potential of the electrode 5 lower than that of the housing 3. Then, particulate matter in the exhaust gas can be charged to a negative polarity by means of these electrons. The particulate matter thus charged to a negative polarity is caused to move by means of a Coulomb force and a gas stream of the exhaust gas. Thereafter, when the particulate matter reaches the housing 3, the electrons, which have charged the particulate matter to a negative polarity, are released to the housing 3. The particulate matter, which has released the electrons to the housing 3, aggregates to become larger in the particle diameter or size of each particle. In addition, the number of particles in the particulate matter is reduced due to the aggregation of the particulate matter. That is, by applying the voltage to the electrode 5, the diameters or sizes of particles in the particulate matter can be made larger, and the number of particles in the particulate matter can be made to reduce.

In addition, when a voltage is applied from the power supply 6 to the electrode 5 by turning on the switch 57, the electrode 5 is placed in a short-circuited state, whereby the temperature of the electrode 5 goes up. As a result of this, substances such as particulate matter, water, and the like, adhered to the electrode 5, can be removed by being oxidized or evaporated.

Incidentally, if unburnt fuel such as HC, CO, etc., is contained in the exhaust gas, upon application of a voltage to the electrode 5, the unburnt fuel will serve as a carrier for electrons, so that an ionic current will flow. Then, when the air fuel ratio of the exhaust gas becomes a rich air fuel ratio, the amount of the unburnt fuel in the exhaust gas will increase, and the ionic current will also increase. As a result, the electric current to be detected will become larger. Then, the ionic current due to the unburnt fuel is by far larger than the electric current which passes through particulate matter when the particulate matter is aggregated.

Here, there is a fear that when an excessively large electric current due to the ionic current passes through the power supply 6, the electrode 5, and other circuits, these devices or elements may be deteriorated or failed. In addition, if the apparatus is constructed so as to withstand such an excessively large electric current, it will result in an increase in the cost of production.

Accordingly, in this embodiment, in cases where the air fuel ratio of the exhaust gas is a rich air fuel ratio, an upper limit is set for the electric power supplied from the power supply 6 to the electrode 5. Thus, if the upper limit is set for the electric power in this manner, when the electric power becomes the upper limit, the voltage will decrease as the electric current increases, so that an increase of the electric current is suppressed. Accordingly, by suppressing the increase of the electric current, it is possible to protect the above-mentioned devices. In addition, because electric power is supplied to the electrode 5, the aggregation of particulate matter can be continued.

On the other hand, in cases where the air fuel ratio of the exhaust gas is a stoichiometric air fuel ratio or a lean air fuel ratio, a target value of a voltage to be applied is calculated, and the voltage is applied in such a manner that it becomes the target value of the voltage to be applied. At this time, almost no unburnt fuel is contained in the exhaust gas, so an electric current corresponding to the number of particles of particulate matter in the exhaust gas passes through the electrode 5.

Here, note that the upper limit of the electric power at the time when the air fuel ratio of the exhaust gas is a rich air fuel ratio can be set to a predetermined value which has beforehand been calculated through experiments, etc. In addition, the lower the air fuel ratio of the exhaust gas, the higher becomes the concentration of the unburnt fuel, so the larger becomes the electric current. As a result, the lower the air fuel ratio of the exhaust gas, the smaller the upper limit of electric power may be made, so that the increase of the electric current can be suppressed.

Moreover, the more an amount of exhaust gas (which may also be a flow rate of exhaust gas) in the internal combustion engine, the more the unburnt fuel which passes through the housing 3 increases, so the more amount of electric current can pass. Accordingly, the more the amount of exhaust gas, the smaller the upper limit of the electric power may be made. Then, the electric power may be controlled by the control device 7 in such a manner that it does not exceed the upper limit, or a circuit may be set in advance in such a manner that the electric power does not exceed the upper limit.

Here, note that in this embodiment, due to the provision of the insulation parts 4, it is suppressed that electricity passes to the exhaust passage 2. Accordingly, the electric current, which passes to the housing 3 through deposits on the electrode 5, particulate matter afloat in the exhaust gas, and unburnt fuel, is detected by means of the detection device 9. In addition, the detection accuracy of the electric current can be enhanced by detecting the electric current in the ground side electric wire 53. In general, the power supply side electric wire 52 is often longer in wiring length or thicker in wiring diameter than the ground side electric wire 53. Then, if an electric current is detected in the power supply side electric wire 52, the rising and falling of the detected electric current become slower than an actual change of the electric current. For this reason, there is a fear that the detection accuracy of the electric current may become low.

On the other hand, in the ground side electric wire 53, wiring can be made relatively short and thin. For this reason, the response to an actual change of electric current is higher when the electric current is detected in the ground side electric wire 53. Accordingly, by detecting an electric current in the ground side electric wire 53, it is possible to detect the electric current in a more accurate manner.

Here, note that in this embodiment, a catalyst for oxidizing unburnt fuel may be provided or arranged at the upstream side of the housing 3. Then, when the catalyst is in an activated state, an amount of unburnt fuel which flows into the housing 3 can be decreased. According to this, it is possible to suppress an excessively large electric current from flowing to the electrode 5.

Figure 2:
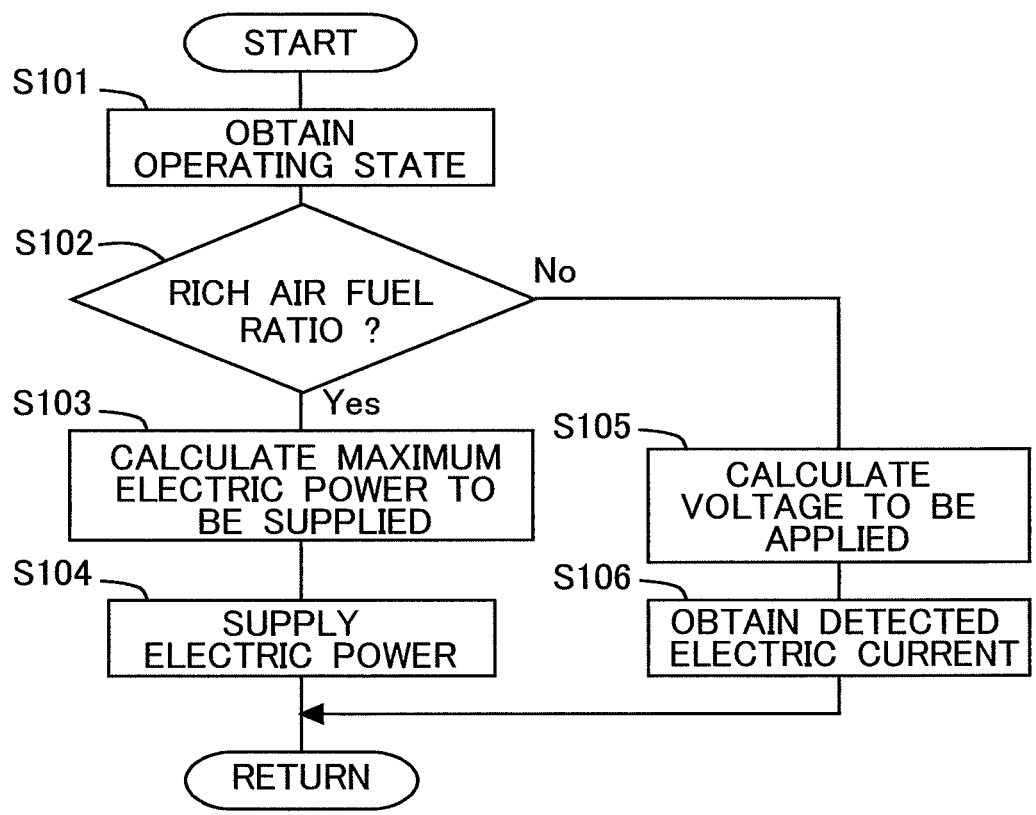
FIG. 2 is a flow chart showing a flow for controlling a voltage to be applied according to the embodiment.

Next, FIG. 2 is a flow chart showing a flow or routine for controlling the voltage to be applied according to this embodiment. This routine is carried out by means of the control device 7 in a repeated manner at each predetermined time interval.

In step S101, the operating state of the internal combustion engine is obtained. For example, the values to be needed for hereafter or subsequent processing, such as the number of engine revolutions per unit time, the engine load, the air fuel ratio of the exhaust gas, and so on, are read in. The number of engine revolutions per unit time is detected by the crank position sensor 72, and the engine load is detected by the accelerator opening sensor 71. In addition, the air fuel ratio of the exhaust gas is detected by the air fuel ratio sensor 75. Here, note that the air fuel ratio of the exhaust gas can also be estimated from the number of engine revolutions per unit time, the engine load, the temperature of the internal combustion engine, and so on. Also, the temperature of the internal combustion engine (e.g., the temperature of lubricating oil or the temperature of cooling water) is detected by the temperature sensor 73.

Further, the amount of exhaust gas in the internal combustion engine is calculated. The amount of exhaust gas in the internal combustion engine has a correlation with the amount of intake air in the internal combustion engine, and hence, can be obtained based on the amount of intake air detected by the air flow meter 74. In addition, the amount of exhaust gas may be estimated from the number of engine revolutions per unit time and the engine load. Or a sensor for detecting the amount of exhaust gas may be provided in the exhaust passage 2. Thus, the control device 7, which calculates the amount of exhaust gas in the internal combustion engine in this manner, corresponds to an exhaust gas amount detection device in the present invention.

In step S102, it is determined whether the air fuel ratio of the exhaust gas obtained in step S101 is a rich air fuel ratio. In this step, it is determined whether a lot of unburnt fuel is contained in the exhaust gas. Then, in cases where an affirmative determination is made in step S102, the routine advances to step S103.

In step S103, a maximum amount of electric power to be supplied, which is the upper limit of the electric power supplied from the power supply 6 to the electrode 5 is calculated. The maximum amount of electric power to be supplied is calculated based on the air fuel ratio of the exhaust gas and the amount of exhaust gas in the internal combustion engine obtained in step S101. The maximum amount of electric power to be supplied has been mapped in advance in such a manner that it becomes smaller in accordance with the lower air fuel ratio of the exhaust gas, and is also smaller in accordance with the larger amount of exhaust gas in the internal combustion engine, and then has been stored in the control device 7. The relations therebetween have beforehand been obtained through experiments, etc. Here, note that in this embodiment, the control device 7, which carries out the processing of step S103, corresponds to a power upper limit setting device in the present invention.

Then, in step S104, electric power is supplied while setting the maximum amount of electric power to be supplied as an upper limit thereof. Because electric current increases due to unburnt fuel, an actual amount of electric power can become constant at the maximum amount of electric power to be supplied. At this time, the voltage decreases in accordance with the increasing electric current. For example, by controlling the voltage in accordance with the detected electric current, the control device 7 controls the electric power so as not to supply an amount of electric power larger than the maximum amount of electric power to be supplied.

On the other hand, in cases where a negative determination is made in step S102, the routine advances to step S105.

In step S105, the voltage to be applied to the electrode 5 is calculated. In cases where the air fuel ratio of the exhaust gas is the stoichiometric air fuel ratio or a lean air fuel ratio, the voltage to be applied is set according to the number of particles in the particulate matter (particles/cm$^3$) to be estimated. This number of particles in the particulate matter is the number of particles in the particulate matter which are discharged from the internal combustion engine, and is the number of particles in the particulate matter before the particulate matter flows into the housing 3. The number of particles in the particulate matter has a correlation with the number of engine revolutions per unit time, the engine load, and the temperature of the internal combustion engine (e.g., the temperature of lubricating oil or the temperature of cooling water), and hence is calculated based on these values. A plurality of maps used for calculating the number of particles in the particulate matter from the number of engine revolutions per unit time and the engine load may be stored according to the temperature of the internal combustion engine, so that the number of particles in the particulate matter may be calculated based on these maps.

Here, note that a sensor for detecting the number of particles in the particulate matter may be mounted on the exhaust passage 2 at a location upstream of the housing 3, so that the number of particles in the particulate matter is detected by this sensor.

Then, the voltage to be applied is calculated based on the number of particles in the particulate matter and the amount of exhaust gas (g/sec) in the internal combustion engine. Such a relation may have beforehand been obtained through experiments, etc., and made into a map.

Here, the smaller the amount of exhaust gas, the smaller becomes the inertia force of the particulate matter, and hence, the influence of an electrostatic action becomes relatively larger. For this reason, it becomes easy for the particulate matter to aggregate. Accordingly, the smaller the amount of exhaust gas, with the smaller voltage to be applied, the particulate matter aggregates. For this reason, the smaller the amount of exhaust gas, the smaller the voltage to be applied is made. In addition, the more the number of particles in the particulate matter, the shorter become the distances between adjacent particles in the particulate matter, and hence, the influence of the electrostatic action becomes relatively larger. For this reason, the more the number of particles in the particulate matter, with the smaller voltage to be applied, the particulate matter aggregates. As a result, the more the number of particles in the particulate matter, the smaller the voltage to be applied is made.

In addition, the voltage to be applied may also be, for example, such a value at which the reduction or decrease rate of the number of particles in the particulate matter becomes a predetermined value (e.g., 40%). Further, the voltage to be applied may also be a specified value which has been set beforehand.

Then, after the voltage to be applied has been calculated, this voltage is applied, and the routine goes to step S106, in which an electric current is detected. This electric current is a value which is detected by the detection device 9. Based on this detected electric current, a variety of kinds of control may be carried out. For example, when water or particulate matter adheres to the electrode 5, the detected electric current will become large, and hence, it may be determined based on the detected electric current whether there exist deposits on the electrode 5. Then, in cases where a determination is made that deposits exist on the electrode 5, by applying a voltage thereto while turning on the switch 57, the temperature of the electrode 5 is raised, thereby making it possible to remove the deposits. In addition, the detected electric current becomes larger in accordance with the increasing amount of aggregation of the particulate matter, so the amount of aggregation of the particulate matter may be estimated based on the detected electric current.

In this manner, the electric power to be applied is restricted or limited at the time of a rich air fuel ratio, so it is possible to suppress an excessively large electric current from flowing to the power supply 6, the electrode 5, and the other circuits. As a result, these devices or elements can be protected. In addition, an increase in the power consumption due to the passage of a large electric current can be suppressed. Consequently, deterioration in fuel economy can be suppressed.

EXPLANATION OF REFERENCE NUMERALS AND CHARACTERS 1 particulate matter processing apparatus
2 exhaust passage
3 housing
4 insulation parts
5 electrode
6 power supply
7 control device
8 battery
9 detection device
21 flange
31 flange
51 insulator part
52 power supply side electric wire
53 ground side electric wire
54 ground electric wire
55 insulator part
56 short circuit electric wire
57 switch
71 accelerator opening sensor
72 crank position sensor
73 temperature sensor
74 air flow meter
75 air fuel ratio sensor

The invention claimed is:

1. A particulate matter processing apparatus comprising:
   an electrode that is arranged in an exhaust passage of an internal combustion engine;
   a power supply that is connected to said electrode and applies a voltage thereto;
   an air fuel ratio detection device that detects or estimates an air fuel ratio of an exhaust gas which flows through said exhaust passage;
   a current detection device that detects an electric current in a ground side electric wire;
   a controller including program logic configured to:
   calculate and set an upper limit for electric power supplied to said electrode from said power supply when the air fuel ratio detected or estimated by said air fuel ratio detection device is a rich air fuel ratio;
   set said upper limit smaller, the lower the air fuel ratio detected or estimated by said air fuel ratio detection device; and
   control the voltage from the power supply to the electrode based on the detected electric current inputted to the controller, so as to not supply an amount of electric power larger than the upper limit.

2. The particulate matter processing apparatus as set forth in claim 1, wherein said controller is further configured to:
   calculate an amount of exhaust gas in the internal combustion engine; and
   set said upper limit smaller the more the amount of exhaust gas that is calculated.

3. The particulate matter processing apparatus as set forth in claim 1, further comprising:
   a housing that is arranged in said exhaust passage with said electrode installed therein;
   an insulation part that is sandwiched between said housing and said exhaust passage and insulates electricity therebetween; and wherein
   said ground side electric wire grounds said housing.

* * * * *